(12) United States Patent
Park et al.

(10) Patent No.: US 9,514,379 B2
(45) Date of Patent: Dec. 6, 2016

(54) SENSING DEVICE AND METHOD USED FOR VIRTUAL GOLF SIMULATION APPARATUS

(75) Inventors: Hyun Jin Park, Daejeon (KR); Hyung Sik Yoon, Daejeon (KR); Hyun Dam Jeong, Daejeon (KR); Hyung Wook Jang, Daejeon (KR)

(73) Assignee: GOLFZON CO., LTD., Daejeon (KR)

( * ) Notice: Subject to any disclaimer, the term of this patent is extended or adjusted under 35 U.S.C. 154(b) by 367 days.

(21) Appl. No.: 14/004,938

(22) PCT Filed: Mar. 22, 2012

(86) PCT No.: PCT/KR2012/002086
§ 371 (c)(1),
(2), (4) Date: Sep. 13, 2013

(87) PCT Pub. No.: WO2012/128575
PCT Pub. Date: Sep. 27, 2012

(65) Prior Publication Data
US 2014/0003666 A1    Jan. 2, 2014

(30) Foreign Application Priority Data

Mar. 22, 2011 (KR) .................. 10-2011-0025149

(51) Int. Cl.
G06K 9/32     (2006.01)
G09B 19/00    (2006.01)
G06K 9/00     (2006.01)

(52) U.S. Cl.
CPC ......... G06K 9/3241 (2013.01); G06K 9/00342 (2013.01); G09B 19/0038 (2013.01)

(58) Field of Classification Search
None
See application file for complete search history.

(56) References Cited

U.S. PATENT DOCUMENTS

| | | | |
|---|---|---|---|
| 5,471,383 A * | 11/1995 | Gobush .............. | A63B 24/0003 473/199 |
| 6,579,190 B2 * | 6/2003 | Yamamoto ......... | A63B 24/0021 473/141 |
| 6,592,465 B2 * | 7/2003 | Lutz ..................... | A63B 43/06 348/208.14 |
| 7,062,082 B2 * | 6/2006 | Miki ..................... | G06T 7/0044 345/418 |
| 7,394,917 B2 * | 7/2008 | Asakura ............... | G06T 7/2053 382/107 |
| 7,641,565 B2 | 1/2010 | Kiraly | |
| 7,837,572 B2 * | 11/2010 | Bissonnette ....... | A63B 24/0003 273/317.2 |
| 7,857,708 B2 * | 12/2010 | Ueda .................. | A63B 24/0003 382/103 |
| 7,959,517 B2 * | 6/2011 | Lastowka .......... | A63B 24/0021 250/333 |
| 8,540,583 B2 * | 9/2013 | Leech .................... | A63B 57/00 473/152 |
| 8,761,441 B2 * | 6/2014 | Kim ..................... | G06T 7/2033 348/143 |
| 8,885,042 B2 * | 11/2014 | Kim .................... | A63B 24/0021 348/135 |
| 8,913,785 B2 * | 12/2014 | Kim .................... | A63B 24/0006 382/100 |
| 2004/0032970 A1 * | 2/2004 | Kiraly ................ | A63B 24/0021 382/103 |
| 2010/0104136 A1 | 4/2010 | Kiraly | |
| 2010/0184496 A1 * | 7/2010 | Nicora ............... | A63B 24/0021 463/5 |

FOREIGN PATENT DOCUMENTS

| KR | 10-2003-0044653 A | 6/2003 | |
|---|---|---|---|
| KR | 10-0953132 B1 | 4/2010 | |
| KR | CA 2830488 A1 * | 9/2012 | ......... G09B 19/0038 |

* cited by examiner

*Primary Examiner* — Tsung-Yin Tsai
(74) *Attorney, Agent, or Firm* — Revolution IP, PLLC

(57) ABSTRACT

Disclosed are a sensing device and method used for a virtual golf simulation apparatus in which an image acquired by an inexpensive camera having a relatively low resolution and velocity is analyzed to relatively accurately extract information on physical properties, such as velocity, direction and altitude angle, of a moving ball, and, particularly, in which the moving trajectory of a golf club is relatively accurately calculated from the acquired image to relatively accurately estimate spin of the ball and to reflect the estimated spin of the ball in golf simulation, thereby constituting a virtual golf simulation apparatus having high accuracy and reliability at low costs and further improving reality of virtual golf.

14 Claims, 16 Drawing Sheets

(a)

(b)

(c)

SENSING DEVICE AND METHOD USED FOR VIRTUAL GOLF SIMULATION APPARATUS

CROSS REFERENCE TO PRIOR APPLICATIONS

This application is a National Stage Application of PCT International Patent Application No. PCT/KR2012/002086 filed on Mar. 22, 2012, under 35 U.S.C. §371, which claims priority to Korean Patent Application No. 10-2011-0025149 filed on Mar. 22, 2011, which are all hereby incorporated by reference in their entirety.

TECHNICAL FIELD

The present invention relates to a sensing device and method used for a virtual golf simulation apparatus, and more particularly to a sensing device and method used for a virtual golf simulation apparatus in which a virtual golf course is imaged and simulated, and the trajectory of a golf ball hit by a user is sensed by the sensing device and is simulated on the virtual golf course.

BACKGROUND ART

In recent years, various devices have been developed which allow users to enjoy popular sports games, such as baseball, soccer, basketball and golf, in rooms or in specific places through simulation in the form of interactive sports games.

Particularly, in recent years, a so-called screen golf system has been developed in which, when a user swings a golf club to hit a golf ball placed on a hitting mat, a sensing device senses the hit golf ball to extract physical information on the moving golf ball so that the trajectory of the golf ball can be simulated on a virtual golf course, thereby allowing the user to enjoy golf in virtual reality.

In order to simulate sports using balls, such as golf balls, in such interactive sports games, much research has been conducted into various sensing systems for accurately sensing physical information on a moving ball, i.e. movement of a ball.

For example, various sensing devices, such as a sensing device using an infrared sensor, a sensing device using a laser sensor, a sensing device using an acoustic sensor and a sensing device using a camera sensor, have come onto the market. Much research has been conducted into a camera sensor type sensing device for acquiring and analyzing an image of a moving ball to accurately sense a state of the moving ball.

In the camera sensor type sensing device, however, an ultrahigh-speed camera having a high resolution is necessary for accurate sensing, which greatly increases costs of the sensing device. On the other hand, if a camera having a relatively low resolution and a relatively low speed is used, the quality of an image acquired by the camera is low with the result that it is very difficult to accurately extract and analyze a ball or a golf club from the acquired image, and therefore, it is very difficult to derive physical properties of the moving ball. In particular, it is very difficult to measure spin of the ball.

DISCLOSURE

Technical Problem

It is an object of the present invention to provide a sensing device and method used for a virtual golf simulation apparatus in which an image acquired by an inexpensive camera having a relatively low resolution and velocity is analyzed to relatively accurately extract information on physical properties, such as velocity, direction and altitude angle, of a moving ball, and, particularly, in which the moving trajectory of a golf club is relatively accurately calculated from the acquired image to relatively accurately estimate spin of the ball and to reflect the estimated spin of the ball in golf simulation, thereby constituting a virtual golf simulation apparatus having high accuracy and reliability at low costs and further improving reality of virtual golf.

Technical Solution

In accordance with an aspect of the present invention, the above and other objects can be accomplished by the provision of a sensing device used in a virtual golf simulation apparatus, including a camera unit for acquiring a plurality of frame images of a ball hit by a user who swings at the ball and a sensing processing unit including a ball image processing means for extracting the ball from each of the frame images to obtain three-dimensional coordinates of the ball and a club image processing means for extracting a moving object of interest from each of the acquired frame images to calculate a moving trajectory of a golf club head from the object of interest, thereby calculating information on physical properties of the moving ball.

In accordance with another aspect of the present invention, there is provided a sensing device used in a virtual golf simulation apparatus, including a camera unit for acquiring a plurality of frame images of a ball hit by a user who swings at the ball and a sensing processing unit including a ball image processing means for extracting a trajectory of the ball from each of the frame images through two-dimensional analysis to extract three-dimensional coordinates of the ball on the trajectory of the ball and a club image processing means for extracting a fitted line with respect to a moving object from each of the acquired frame images through two-dimensional analysis and for extracting a moving trajectory of a golf club head through three-dimensional matching of the fitted line, thereby calculating information on physical properties of the moving ball.

In accordance with another aspect of the present invention, there is provided a sensing device used in a virtual golf simulation apparatus, including a camera unit for acquiring a plurality of frame images of a ball hit by a user who swings at the ball and a sensing processing unit including a first processing means for extracting and congregating differences between the respective frame images to extract a moving object of interest and for extracting a fitted line from the extracted object of interest and a second processing means for calculating a trajectory of a specific portion on the fitted line as a moving trajectory of a golf club head.

In accordance with another aspect of the present invention, there is provided a sensing device used in a virtual golf simulation apparatus, including a camera unit including a plurality of cameras for acquiring a plurality of frame images of a ball hit by a user who swings at the ball and a sensing processing unit for extracting a fitted line with respect to a moving object of interest from each of the images acquired by the respective cameras through two-dimensional analysis and for extracting a trajectory of a specific portion on the fitted line as a moving trajectory of a golf club head through three-dimensional matching of the fitted line, which has been two-dimensionally analyzed.

In accordance with another aspect of the present invention, there is provided a sensing method of a sensing device used in a virtual golf simulation apparatus, including successively collecting images of a predetermined capturing range in which hitting is performed, analyzing the acquired images to sense whether a user has hit a ball, extracting and analyzing the ball from a plurality of frame images after impact time when the ball has been hit to calculate information on physical properties of the moving ball, and extracting and analyzing a moving trajectory of a golf club head to estimate spin of the moving ball.

In accordance with a further aspect of the present invention, there is provided a sensing method of a sensing device used in a virtual golf simulation apparatus, including acquiring a plurality of frame images of a ball hit by a user who swings at the ball, extracting a moving object of interest from each of the acquired images, fitting a straight line with respect to the extracted object of interest, calculating a trajectory of a specific portion on the fitted line, and determining the calculated trajectory as a moving trajectory of a golf club head to estimate spin of the moving ball therefrom.

Advantageous Effects

The sensing device and method used for a virtual golf simulation apparatus according to the present invention has effects that an image acquired by an inexpensive camera having a relatively low resolution and velocity is analyzed to relatively accurately extract information on physical properties, such as velocity, direction and altitude angle, of a moving ball, and, particularly, in which the moving trajectory of a golf club is relatively accurately calculated from the acquired image to relatively accurately estimate spin of the ball and to reflect the estimated spin of the ball in golf simulation, thereby constituting a virtual golf simulation apparatus having high accuracy and reliability at low costs and further improving reality of virtual golf.

DESCRIPTION OF DRAWINGS

FIG. 9 is a view illustrating a pixel compensation method, wherein FIG. 9(a) is a view showing an image, and FIGS. 9(b) and 9(c) are views showing portions, each of which corresponds to a 3×3 matrix, separated from the image;

BEST MODE

Now, exemplary embodiments of a virtual golf simulation apparatus according to the present invention and a sensing device and method used for the same will be described in detail with reference to the accompanying drawings.

First, a virtual golf simulation apparatus according to an embodiment of the present invention and a sensing device used in the same will be described with reference to FIGS. 1 and 2.

Figure 1:
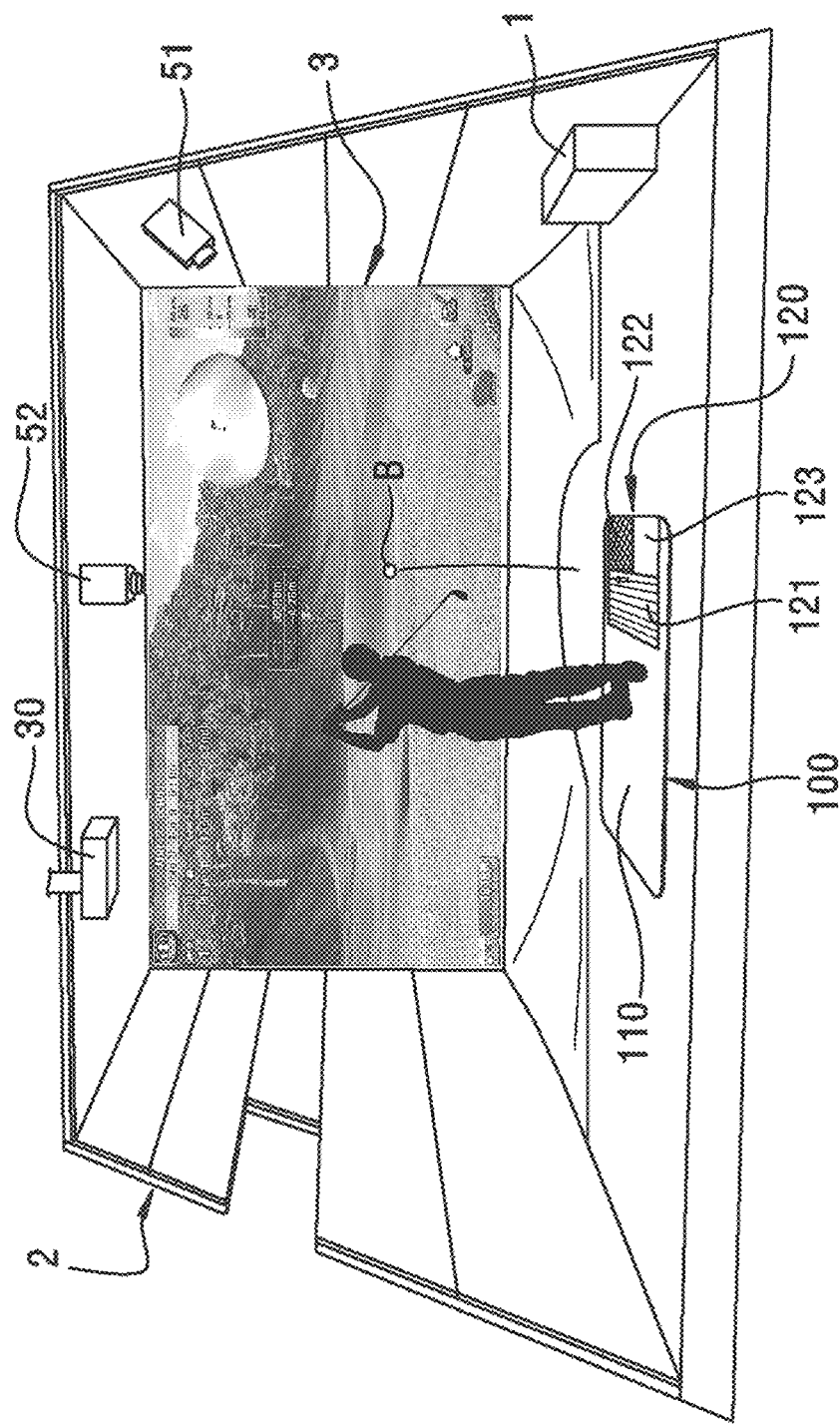
FIG. 1 is a view showing an example of a screen golf system to which a virtual golf simulation apparatus according to an embodiment of the present invention is applied.
Figure 2:
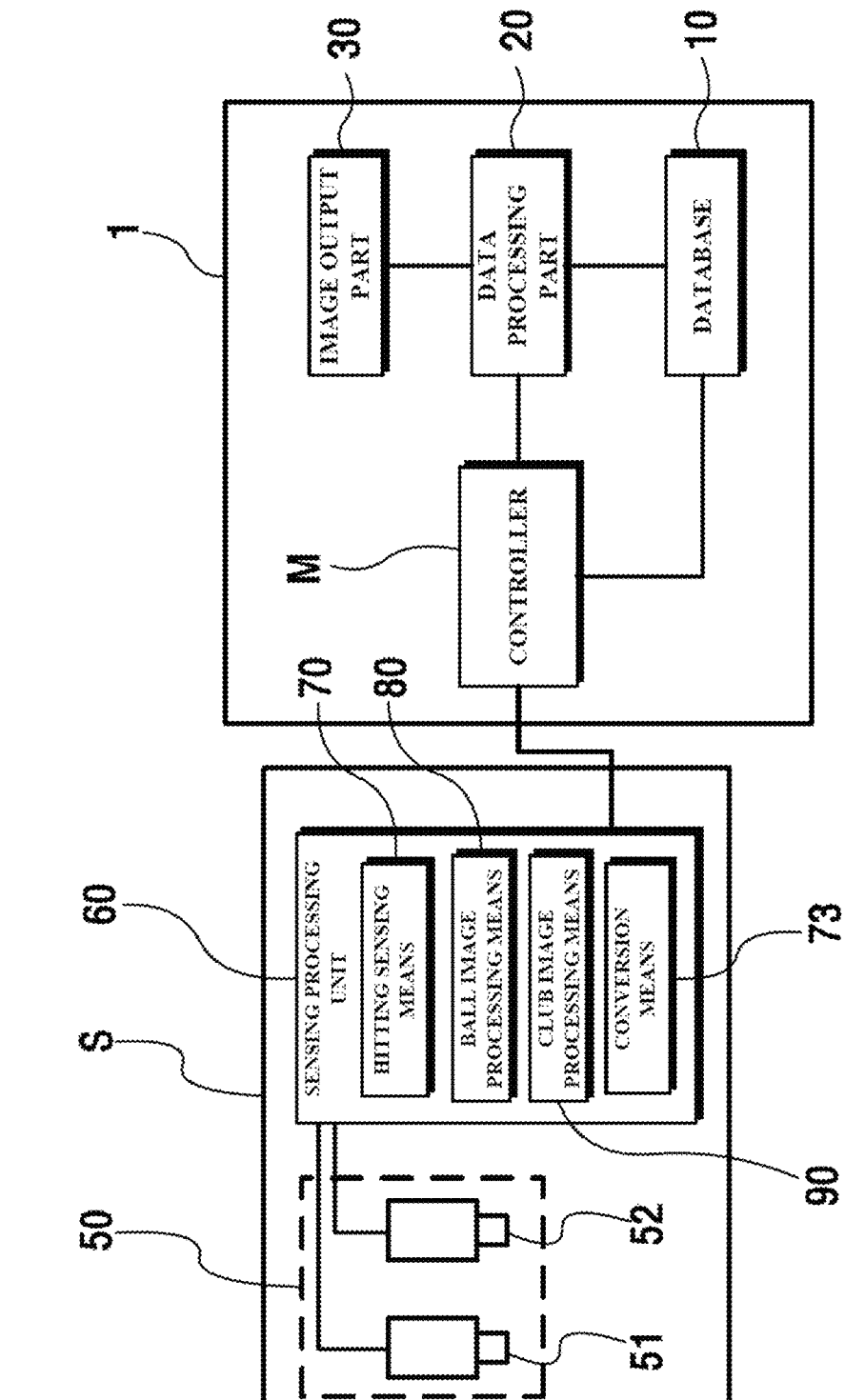
FIG. 2 is a block diagram showing the construction of a virtual golf simulation apparatus according to an embodiment of the present invention.

FIG. 1 is a view showing an example of a screen golf system to which a virtual golf simulation apparatus according to an embodiment of the present invention is applied, and FIG. 2 is a block diagram showing the construction of a virtual golf simulation apparatus applied to the screen golf system shown in FIG. 1.

As shown in FIGS. 1 and 2, the virtual golf simulation apparatus according to the embodiment of the present invention includes a sensing device S for sensing a golf ball B hit by a user and a simulator 1 for realizing an image of a virtual golf course and providing a simulation image of the trajectory of the golf ball B on the virtual golf course based on the result sensed by the sensing device S so that virtual golf simulation can be performed.

As shown in FIG. 1, the screen golf system, to which the virtual golf simulation apparatus according to the embodiment of the present invention is applied, may be configured to have a structure in which a hitting box 110, on which a user hits a golf ball B, is provided on the floor of a golf booth 2 providing a space of a predetermined size, a hitting mat 120, on which a golf ball B is placed so that the user can hit the golf ball B on the hitting box 110, is provided at one side of the hitting box 110, and a screen 3, on which an image of virtual golf simulation output from an image output device (an image output part 30 shown in FIG. 2, such as a beam projector), to which image information is transmitted from the simulator 1, is projected, is provided at the front of the golf booth 2.

The hitting box 110 and the hitting mat 120 are provided on a swing plate 100 as shown in FIG. 1. Alternatively, the hitting box 110 and the hitting mat 120 may be provided on the floor of the golf booth 2.

The swing plate 100 may be provided so that the swing plate 100 can be sloped at a predetermined angle in the forward and rearward direction and in the left and right direction. Also, the swing plate 100 may be connected to the simulator 1 so that the swing plate 100 can be sloped in correspondence to the topography of a virtual golf course which is presently being realized.

The hitting mat 120 may be formed of artificial turf. As shown in FIG. 1, the hitting mat 120 may be divided into a fairway zone 121, a rough zone 122 and a bunker zone 123 respectively corresponding to a fairway, a rough and a bunker of a real golf course. Preferably, the fairway zone 121, the rough zone 122 and the bunker zone 123 are configured, so that the fairway zone 121, the rough zone 122 and the bunker zone 123 have different lengths of artificial turf or so that the fairway zone 121, the rough zone 122 and the bunker zone 123 are formed of different materials, in a manner similar to the real golf course. FIG. 1 shows that the hitting mat 120 includes the fairway zone 121, the rough zone 122 and the bunker zone 123; however, the present invention is not limited thereto. For example, the hitting mat 120 may include only the fairway zone 121 or may include the rough zone 122 or the bunker zone 123 together with the fairway zone 121. In FIG. 1, reference numeral 124 indicates a tee.

Meanwhile, as shown in FIG. 1, the sensing device S is provided in the golf booth 2 to sense a golf ball B hit by a user.

That is, as shown in FIG. 2, the sensing device S may include a camera unit 50 including a plurality of cameras 51 and 52, and a sensing processing unit 60 for processing an image acquired by the camera unit 50 to extract physical properties of the moving golf ball.

The camera unit 50 may be constituted by a single camera for image sensing or two or more cameras. In order to acquire an image of a moving golf ball B and extract coordinates of the golf ball in a three-dimensional space, it is preferable to configure a stereo type camera unit using two or more cameras 51 and 52, which are operatively connected to each other, as shown in FIG. 1.

The physical properties of the moving golf ball may include velocity of the golf ball, a moving direction of the golf ball (a moving angle of the golf ball in the horizontal direction), an altitude angle of the golf ball (a moving angle of the golf ball in the vertical direction), and spin of the golf ball.

The sensing processing unit 60 may include a grabber 65 for sequentially collecting images acquired by the camera unit 50 on a per frame basis, a hitting sensing means 70 for receiving and processing the images collected by the grabber 65 to sense whether hitting preparation has been completed and whether hitting has been performed by a user, a ball image processing means 80 for processing an image of the hit golf ball received from the hitting sensing means 70, when the hitting sensing means 70 senses that the golf ball has been hit by the user, to extract information on physical properties of the moving golf ball, and a club image processing means 90 for analyzing the moving trajectory of the a golf club from the image received from the hitting sensing means 70 to extract information on spin of the ball.

Also, the sensing processing unit 60 may further include a conversion means 73 for matching images acquired by the cameras 51 and 52 to convert two-dimensional information of each camera image (information extracted from each camera is two-dimensional information) into three-dimensional information or to inversely convert three-dimensional information extracted by matching a plurality of camera images into two-dimensional information.

Meanwhile, the simulator 1 constituting the virtual golf simulation apparatus according to the embodiment of the present invention preferably includes a controller M, a database 10, an data processing part 20 and an image output part 30.

The database 10 stores all data necessary for virtual golf simulation. For example, the database 10 stores data necessary to drive the system, data necessary to realize an image of a virtual golf course, and data necessary to realize a simulation image of the trajectory of a golf ball.

The data processing part 20 is a part which performs predetermined image processing to realize an image of a virtual golf course or a simulation image of the trajectory of a golf ball on the virtual golf course.

The image output part 30 outputs image information received from the data processing part 20 to a screen so that a user can watch the image.

The controller M receives information based on the result sensed by the sensing device S to control operations of all components, such as the database 10, the data processing part 20 and the image output part 30, of the simulator 1. That is, the controller M, the database 10 and the data processing part 20 function as an image realization means for realizing a simulation image of the trajectory of a golf ball based on the result sensed by the sensing device S.

Hereinafter, more detailed construction of the sensing device S shown in FIG. 2 and functions of the respective components constituting the sensing device will be described with reference to FIG. 3.

Figure 3:
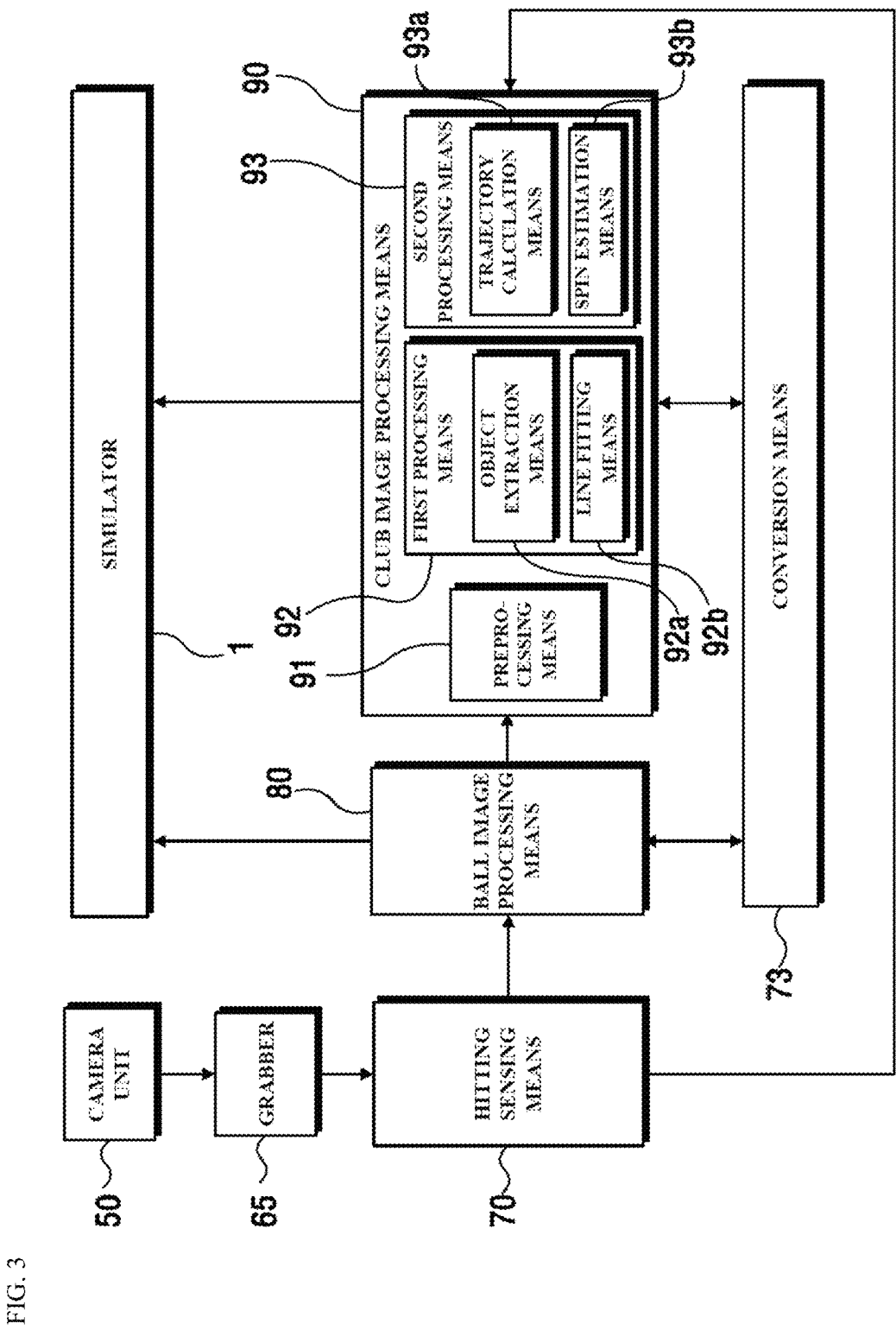
FIG. 3 is a view schematically showing more detailed construction of a sensing device shown in FIG. 2 and functions of components constituting the sensing device.

As shown in FIG. 3, transmission of information in the sensing device according to the present invention is carried out in the order of the camera unit 50→the grabber 65→the hitting sensing means 70→the ball image processing means 80 and the club image processing means 90→the simulator 1.

The camera unit 50 captures a predetermined range including a portion at which the hitting box and the hitting mat are provided to acquire hundreds of frame images per second.

The acquired frame images are transmitted to the grabber 65. The grabber 65 stores the images received from the camera unit 50 and, at the same time, transmits the images to the hitting sensing means 70 so that image processing is carried out.

Preferably, the hitting sensing means 70 finds a ball from the image received from the grabber 65 and determines whether the ball satisfies a predetermined condition to sense whether hitting preparation has been completed. Also, the hitting sensing means 70 determines whether the ball is moved from a position at which the hitting preparation has been completed to sense whether hitting has been performed by a user.

Figure 4:
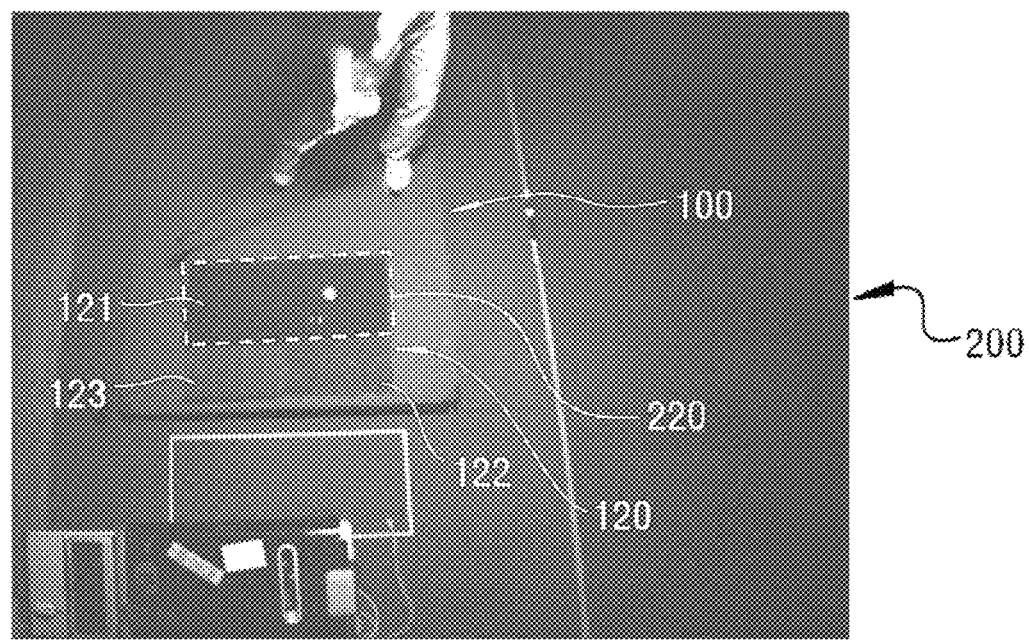
FIG. 4(a) is a view showing an image acquired by a camera unit.
FIG. 4(b) is a view showing a sensing region separated from the image shown in FIG. 4(a)
FIG. 4(c) is a view showing sensing of whether a ball has been hit through the separated sensing region.
Figure 4:
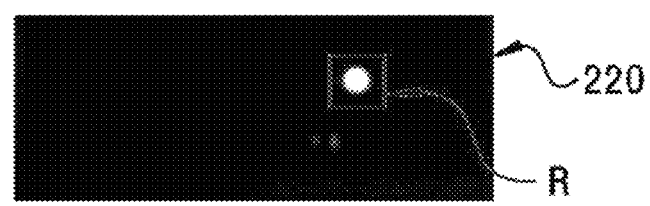
Figure 4:
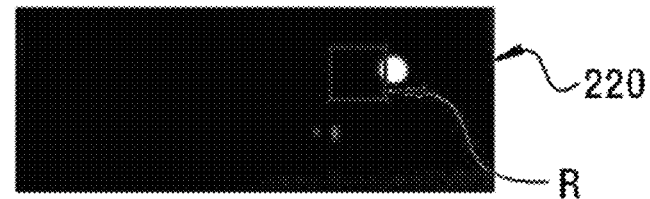

FIGS. 4(a) to 4(c) show a process of the hitting sensing means 70 sensing whether hitting has been performed by the user.

FIG. 4(a) is a view showing one of several frame source images transmitted from the grabber 65 to the hitting sensing means 70.

The hitting sensing means 70 sets a hitting region 220 in a source image 200, separates the hitting region 220 from the source image 200, and finds a ball from the hitting region 220. At this time, as shown in FIG. 4(a), a region corresponding to a portion or the entirety of the hitting mat 120 may be set as the hitting region 220. That is, a predetermined region about a position of the hitting mat 120 at which a ball is placed may be set as the hitting region 220.

In the source image 200 shown in FIG. 4(a), a ball is placed on the fairway zone 121 of the hitting mat 120, and the hitting sensing means 70 sets a region corresponding to the fairway zone 121 as the hitting region 220. If the ball is placed on the rough zone 122, a region corresponding to the rough zone 122 may be set as the hitting region. On the other hand, if the ball is placed on the bunker zone 123, a region corresponding to the bunker zone 123 may be set as the hitting region.

In this way, the hitting region 220 is separated, and a ball is found from only the hitting region 220, thereby more rapidly and accurately finding the ball than when finding the ball from the entirety of the source image.

A process of finding a ball from the separated hitting region 220 may be performed using various methods. For example, a degree of similarity between a specific object present in the hitting region 220 and a ball template preset and stored as a reference image of a ball may be analyzed, and, if the degree of similarity therebetween is equal to or greater than a predetermined level, the specific object may be determined as a ball.

Also, as shown in FIG. 4(b), a sensing region R of a predetermined size about the ball is set in the image of the hitting region 220. The sensing region R is preferably set to have a small size sufficient to include a ball. Whether a user has hit a ball can be easily determined by sensing whether or not the ball is placed in the sensing region R.

Consequently, it is possible to sense that hitting has been performed by sensing that the ball is not placed in the sensing region R from a state shown in FIG. 4(b) to a state shown in FIG. 4(c).

Upon sensing that hitting has been performed as described above, the hitting sensing means 70 investigates a plurality of frame images received before the hitting has been performed to confirm when the ball started to move, i.e. impact time, and the image frame at the impact time is designated as a trigger frame.

The hitting sensing means 70 stores a plurality of frame images before impact on the basis of the trigger frame and transmits the stored frame images to the club image processing means 90 so that necessary image processing can be performed. The images transmitted to the club image processing means 90 may include an image of the frame at the impact time, i.e. the trigger frame.

Also, the hitting sensing means 70 stores a plurality of frame images (the trigger frame may be included) after impact on the basis of the trigger frame and, at the same time, transmits the stored frame images to the ball image processing means 80 in real time so that necessary image processing can be performed. The images transmitted to the ball image processing means 80 are transmitted to the club image processing means 90 so that image processing can be performed. Consequently, the club image processing means 90 receives and processes a plurality of frame images before impact and a plurality of frame images after impact.

The ball image processing means 80 processes the images received from the hitting sensing means 70 to extract information on three-dimensional coordinates of the ball and to calculate information on physical properties, such as velocity, direction and altitude angle, of the moving ball using the extracted information.

The club image processing means 90 extracts information on moving trajectory of a golf club head and estimates spin of the moving ball using the extracted information.

Information on physical properties of the ball extracted by the ball image processing means 80 and the club image processing means 90 is transmitted to the simulator 1. The simulator 1 outputs a simulation image, in which the ball is moved on a virtual golf course, based on the received information so that virtual golf simulation can be performed.

The ball image processing means 80 basically extracts ball candidates from the images in the respective frames acquired by the camera unit 50, converts three-dimensional coordinates of each of the ball candidates into two-dimensional coordinates, and analyzes the two-dimensional trajectory of each of the ball candidates to extract the final trajectory of the golf ball, thereby calculating information on physical properties of the moving golf ball.

Figure 5:
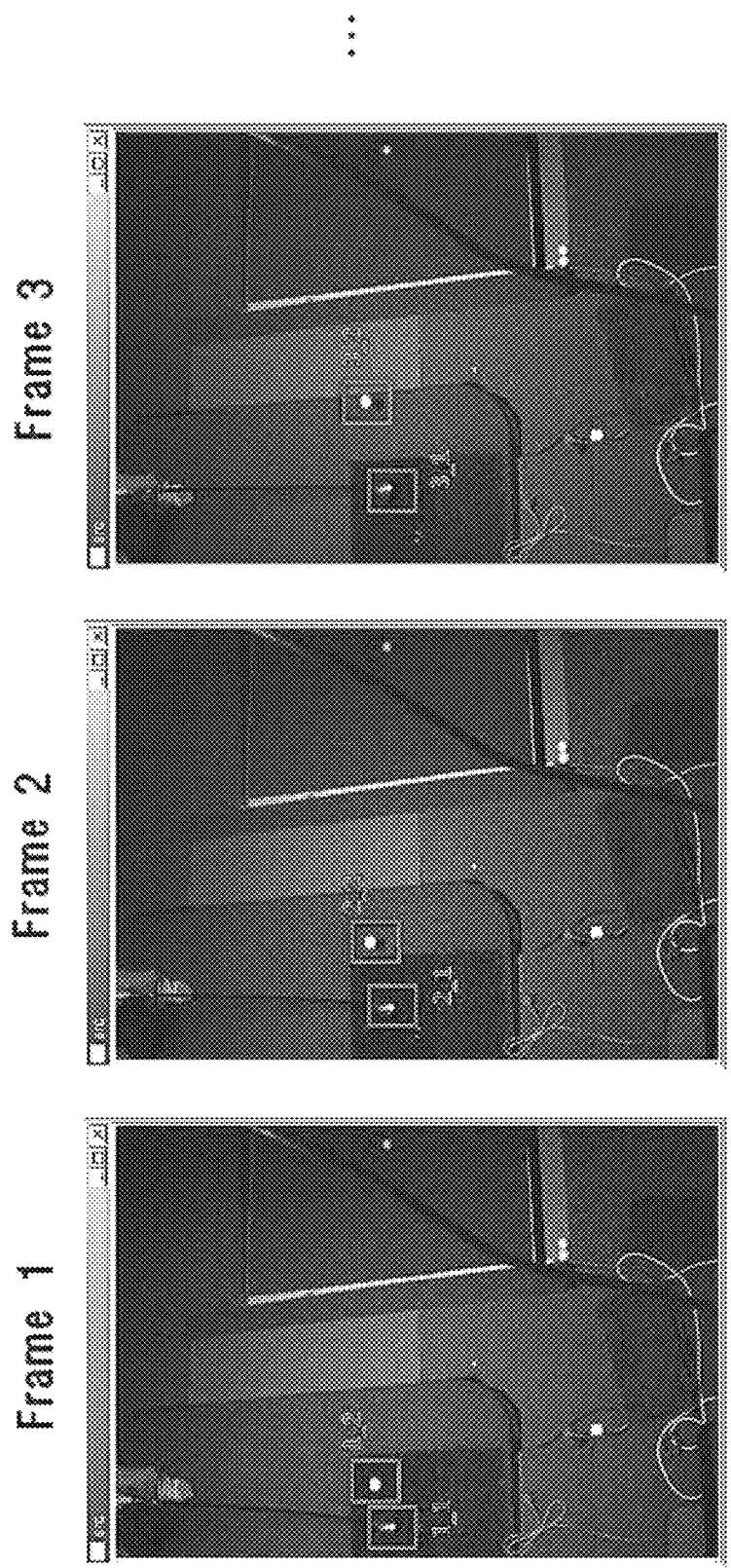
FIG. 5 is a view showing ball candidates in respective frames extracted by a ball image processing means of the sensing device according to the embodiment of the present invention.

That is, as shown in FIG. 5, the ball image processing means 80 extracts ball candidates (ball candidates 1_1 and 1_2 in an image of frame No. 1, ball candidates 2_1 and 2_2 in an image of frame No. 2, etc. in FIG. 5) from the respective frames with respect to the images acquired by the camera unit 50 and creates a ball trajectory list to connect the respective ball candidates with respect to the successive frames. Also, as shown in FIG. 6, the ball image processing means 80 performs second-order polynomial regression analysis with respect to the created ball trajectory list to display the ball trajectory list in the form of two-dimensional trajectories (curve 1 to curve 3) on a two-dimensional plane, extracts the final trajectory of a ball from the two-dimensional trajectories according to a predetermined condition, and extracts coordinates of the respective balls on the extracted trajectory of the ball (coordinates of the ball candidates on the finally selected two-dimensional trajectory), thereby calculating information on physical properties of the moving ball.

Figure 6:
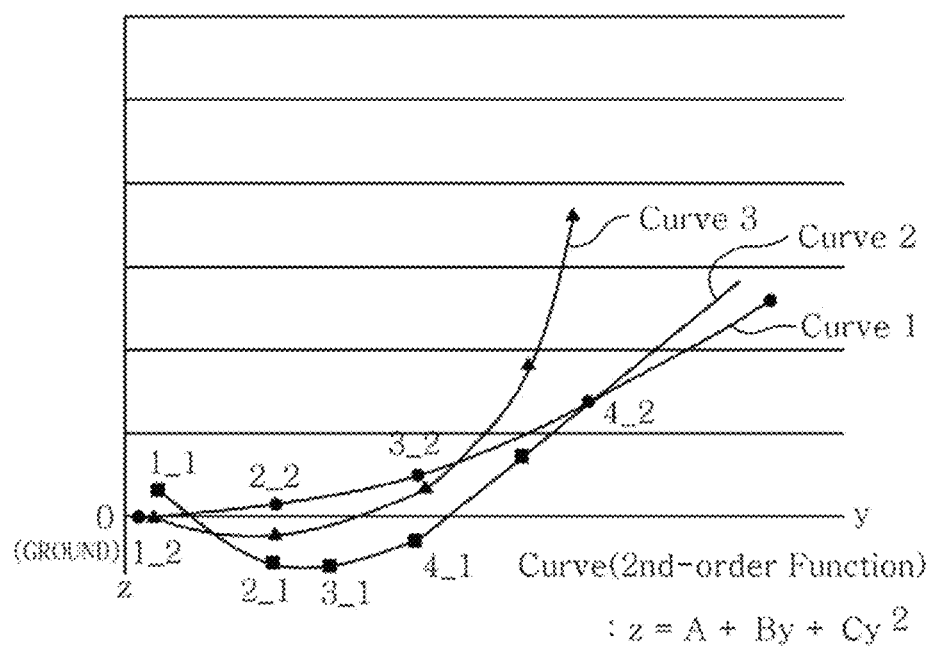
FIG. 6 is a view showing combination of the ball candidates in the respective frames to show ball trajectory candidates on a two-dimensional plane.

FIG. 6 is a view showing two-dimensional trajectories according to a ball trajectory list displayed on a two-dimensional plane through second-order polynomial regression analysis.

Some of the two-dimensional trajectories extracted as described above may contain various kinds of noise and may thus be incorrect. For this reason, the incorrect two-dimensional trajectories are removed to finally select the trajectory of the ball.

For example, one, connected to the underground, of the two-dimensional trajectories obtained as the result of the second-order polynomial regression analysis shown in FIG. 6 cannot be considered as the trajectory of the ball (this is because, when a ball is hit by a user who swings a golf club to hit the ball, the ball does not fly through the ground; the trajectory connected to the underground occurs since a portion of the golf club is selected as a ball candidate), and therefore, the final trajectory of the ball is selected excluding the above trajectory.

If a plurality of two-dimensional trajectories is left even after two-dimensional trajectories which cannot be considered as the trajectories of the ball, general physical laws occurring when the ball is moved may be applied to select the final trajectory of the ball.

For example, when a ball is hit toward the screen, the ball, moving within a short section of approximately 5 m to 10 m, moves at approximately uniform velocity in the horizontal direction and at the approximately uniform acceleration in the vertical direction. Consequently, it is possible to select a two-dimensional trajectory coinciding with such a motion law as the final trajectory of the ball.

Hereinafter, the construction and process of the club image processing means shown in FIG. 3 will be described with reference to FIGS. 7 to 14.

As shown in FIG. 3, the club image processing means may include a preprocessing means 91, a first processing means 92 and a second processing means 93.

The preprocessing means 91 performs various kinds of image processing to easily extract and process an image of the golf club from the image received from the hitting sensing means 70 or the ball image processing means 80. Image processing performed by the preprocessing means 91 will be described below with reference to FIGS. 7 to 10.

The first processing means 92 extracts and congregates differences between the respective frame images to extract moving objects of interest, and extracts fitted lines from the extracted objects of interest. The second processing means 93 calculates the trajectory of a specific portion on each of the fitted lines as the moving trajectory of the golf club head to estimate spin of the moving ball.

More specifically, the first processing means 92 may include an object extraction means 92a for extracting and congregating differences between a frame image and another frame image with respect to all frame images to be processed to extract a portion corresponding to the golf club as an object of interest and a line fitting means 92b for fitting a straight line with respect to the extracted object of interest.

The second processing means 93 may include a trajectory calculation means 93a for inspecting coordinate movement of a specific portion on the line fitted by the line fitting means 92b to calculate a moving trajectory and a spin estimation means 93b for determining the calculated moving trajectory as the moving trajectory of the golf club head, for extracting the moving direction of the golf club head from the moving trajectory, and for estimating spin of the ball therefrom.

Image processing performed by the first processing means 92 and the second processing means 93 will be described below with reference to FIGS. 11 to 14.

First, image processing performed by the preprocessing means of the club image processing means will be described below with reference to FIGS. 7 to 10.

Figure 7:
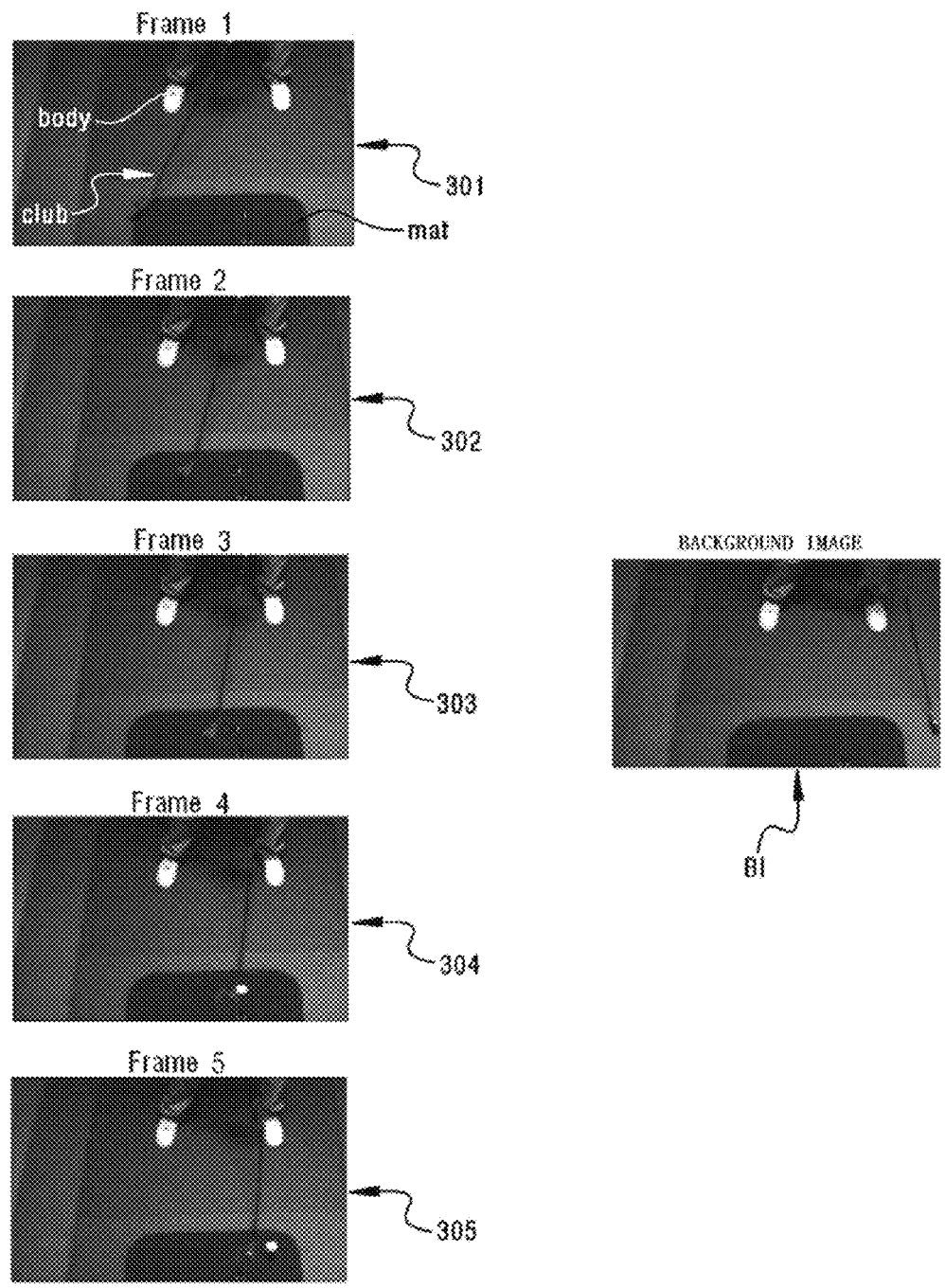
FIG. 7 is a view showing a plurality of frame images collected by a club image processing means of the sensing device according to the embodiment of the present invention and a background image for difference operation.

The club image processing means processes a plurality of frame images before and after impact, calculates the trajectory of the golf club head, and estimates spin of the ball therefrom. The number of frame images may be changed according to setting. In FIG. 7 and following figures, image processing is performed using five frame images before and after impact, i.e. five sheets of images; however, the present invention is not limited thereto. Less than five frame images or more than five frame images may be processed.

Images of frame No. 1 to frame No. 5 Shown in FIG. 7 are acquired by a camera of the camera unit which acquires a ball hit by a user. Five images before and after impact are acquired.

The images of frame No. 1 to frame No. 5 Shown in FIG. 7 are source images 301 to 305 acquired by the camera. The images contain a portion of the body of a user (denoted by body), a golf club (denoted by club) and a hitting mat (denoted by mat).

The primary purpose of the club image processing means is to extract only the golf club portion from the source images 301 to 305 of the respective frames.

To this end, a background image BI is provided as shown in FIG. 7, and a difference operation is carried out between the source images 301 to 305 of the respective frames and the background image BI. Preferably, the background image BI is acquired at a time different from the time when the respective frame images are acquired.

Figure 8:
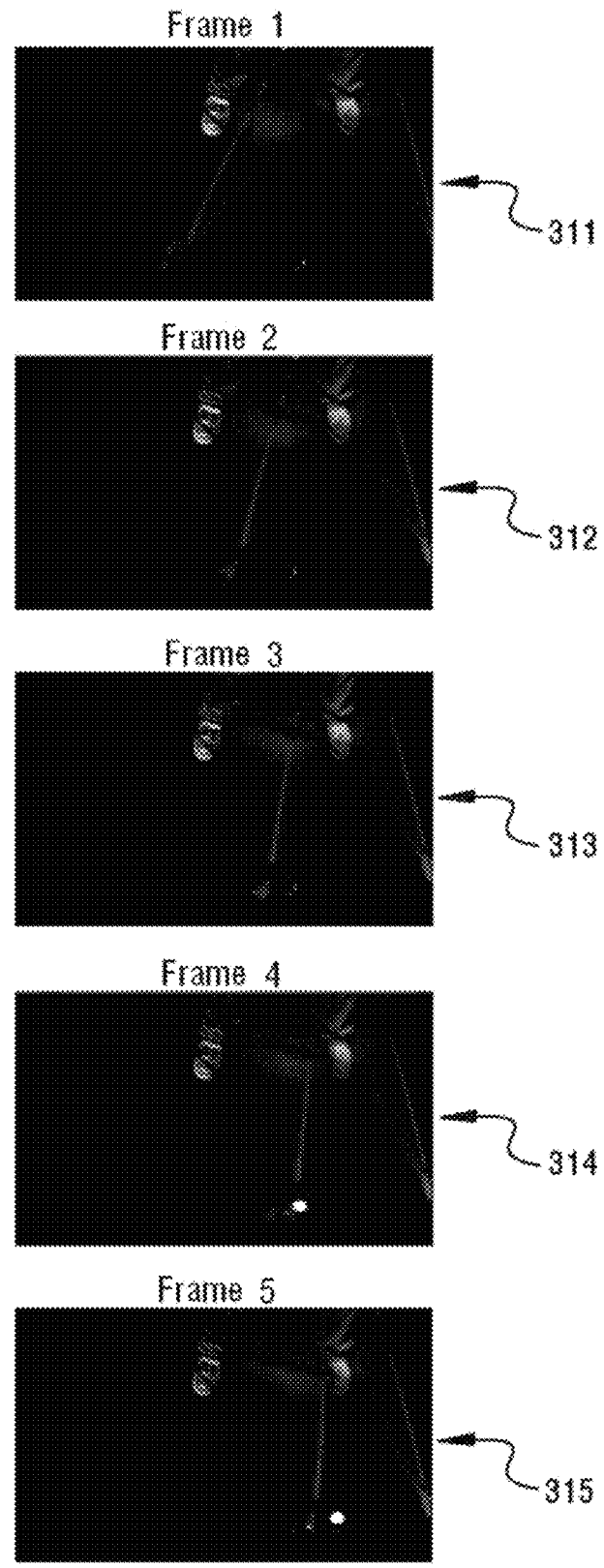
FIG. 8 is a view showing images obtained through difference operation between the respective frame images and the background image shown in FIG. 7.

Images of frame No. 1 to frame No. 5 shown in FIG. 8 are obtained through the difference operation between the respective source images 301 to 305 of frame No. 1 to frame No. 5 shown in FIG. 7 and the background image BI.

That is, an image 311 of frame No. 1 shown in FIG. 8 may be obtained through the difference operation between the source image 301 of frame No. 1 and the background image BI. In this way, images 311 to 315 of frame No. 1 to frame No. 5 shown in FIG. 8 are obtained. The images 311 to 315 of frame No. 1 to frame No. 5 shown in FIG. 8 are referred to as difference images.

As shown in FIG. 8, still portions (for example, a background portion and a mat portion) are removed from the difference image 311 of frame No. 1 to the difference image 315 of frame No. 5 with the result that moving portions (for example, a portion of the body of the user and the golf club; although the portion of the body of the user does not greatly move but so considerably moves that a great deal of the portion of the body of the user cannot be removed through the difference operation) remain.

Extraction of the difference images as described above is carried out with respect to images acquired by another camera of the camera unit in the same manner.

As can be seen from the difference images 311 to 315 of the respective frames shown in FIG. 8, if the brightness of the images is lowered during difference operation, it is necessary to increase the brightness of the images. That is, it is necessary to increase the brightness of the moving portions while keeping the brightness of the still portions unchanged.

Figure 9:
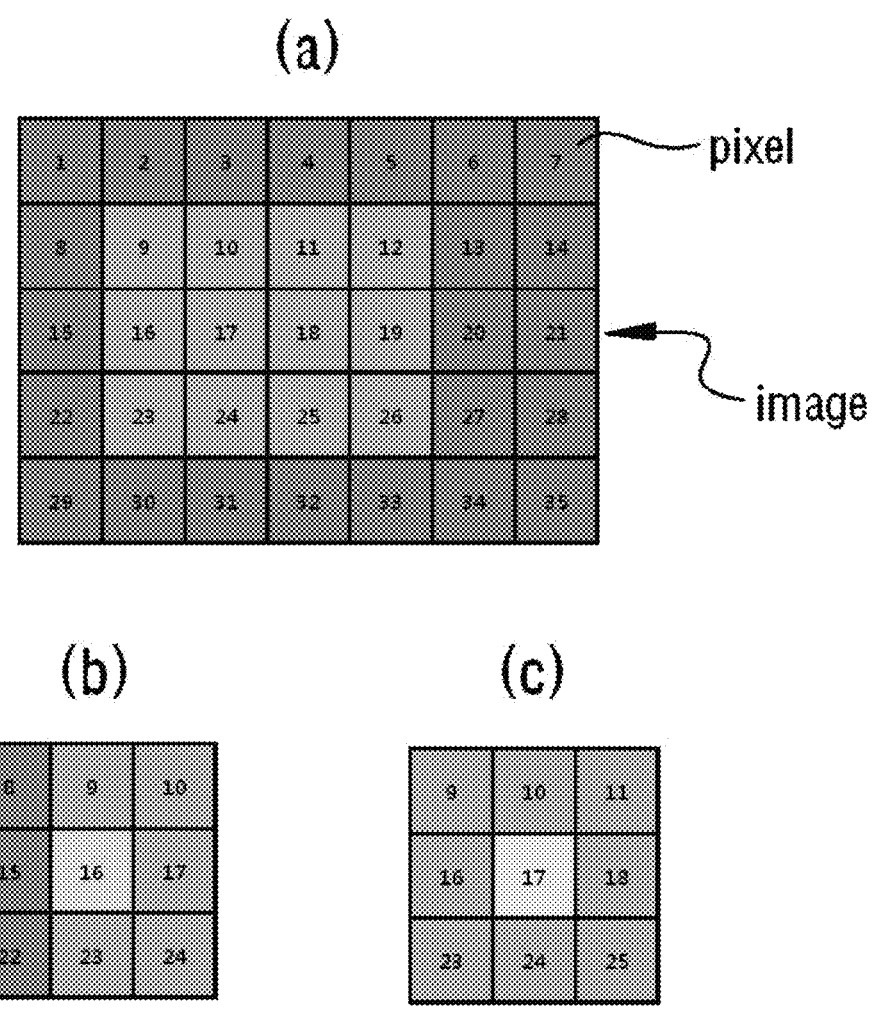

An example of a method of increasing the brightness of the moving portions while keeping the brightness of the still portions unchanged is shown in FIG. 9.

That is, pixel values (for a black-and-white image, pixel values are expressed as brightness values) of a predetermined number of pixels around each pixel of an image are congregated to the corresponding pixel. For example, as shown in FIGS. 9(b) and 9(c), pixel values of peripheral pixels corresponding to a 3×3 matrix are congregated to correct the brightness of the central pixel.

On the assumption that an image shown in FIG. 9(a) includes 35 pixels ranging from a first pixel to a 35-th pixel, pixel values of peripheral pixels corresponding to a 3×3 matrix are congregated with respect to each pixel of the image to correct the brightness of the central pixel.

That is, on the assumption that a pixel value of pixel No. 16 or pixel No. 17 is to be corrected as shown in FIG. 9(b) or 9(c), pixel values of pixels, arranged in a 3×3 matrix, around pixel No. 16 or pixel No. 17 are congregated to correct the pixel value of pixel No. 16 (FIG. 9(b)) or pixel No. 17 (FIG. 9(c)) so that the brightness of pixel No. 16 or pixel No. 17 is increased. In this way, pixel values corresponding to a 3×3 matrix are congregated with respect to all pixels ranging from the first pixel to the 35-th pixel to correct the pixel values of the respective pixels.

Through correction of each pixel as described above, it is possible to increase the brightness of moving portions while maintaining the pixel value of a dark background portion almost without change.

Figure 10:
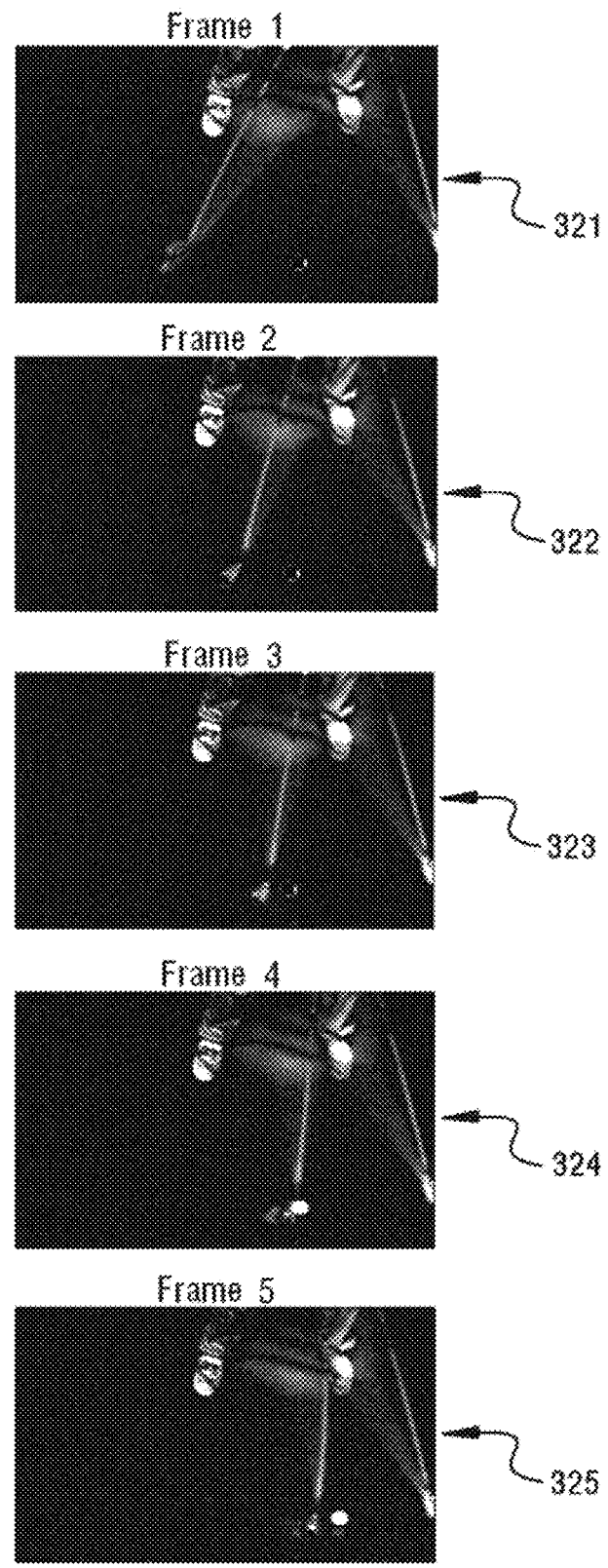
FIG. 10 is a view showing images obtained through pixel compensation of the respective frame images shown in FIG. 8 according to a principle shown in FIG. 9.

Corrected images 321 to 325 of frame No. 1 to frame No. 5 shown in FIG. 10 are obtained by correcting pixel values of peripheral pixels corresponding to a 3×3 matrix as shown in FIG. 9 to a central pixel with respect to the respective difference images 311 to 315 shown in FIG. 9.

It can be seen from the corrected images 321 to 325 of frame No. 1 to frame No. 5 shown in FIG. 10 that the brightness of moving portions, i.e. a portion of the body of the user and a golf club portion, have been increased.

Correction of each pixel of each of the images as described above is carried out with respect to images acquired by another camera of the camera unit in the same manner.

However, the corrected images 321 to 325 shown in FIG. 10 still contain noise, such as a portion of the body of the user. A portion of interest, i.e. an object of interest, of an image to be processed by the club image processing means is a golf club portion. The remaining portions are noise.

For this reason, it is necessary to remove unnecessary noise, such as a portion of the body of the user, and to extract only the object of interest, i.e. the golf club portion.

Figure 11:
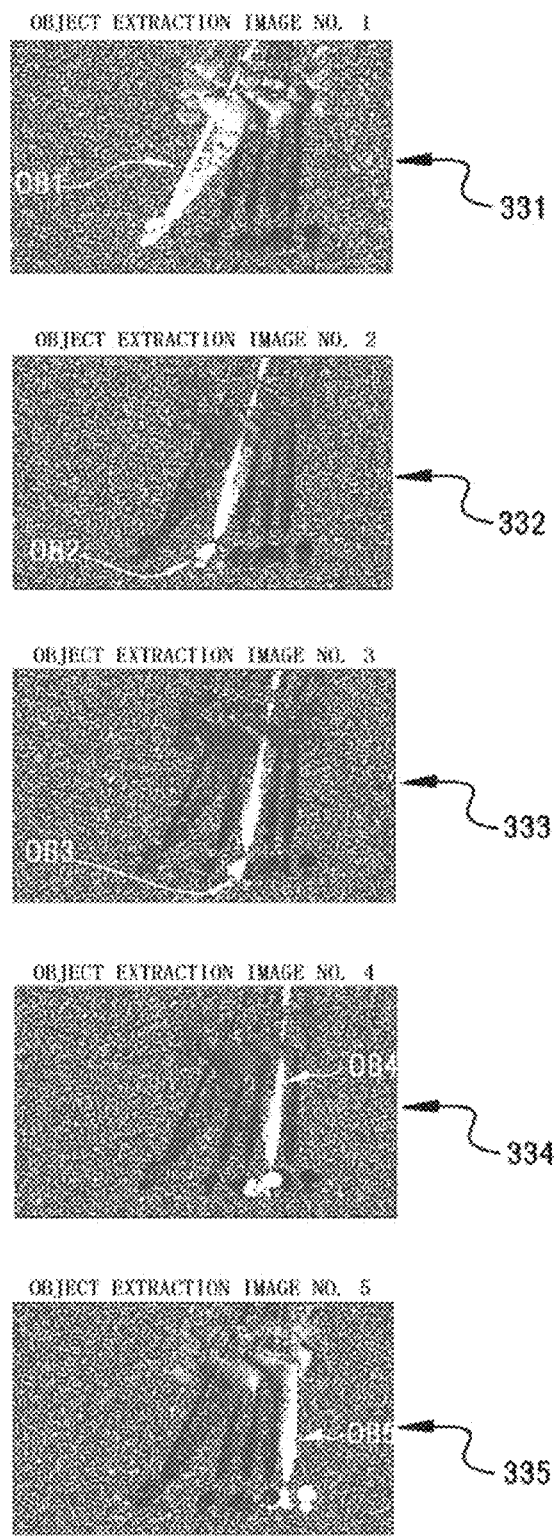
FIG. 11 is a view showing images obtained by extracting objects of interest from the respective frame images shown in FIG. 10.

Object extraction image No. 1 (331) to object extraction image No. 5 (335) shown in FIG. 11 are obtained by extracting objects of interest OB1 to OB5 from the corrected images 321 to 325 of frame No. 1 to frame No. 5 shown in FIG. 10.

That is, object extraction image No. 1 (331) is created by extracting and congregating differences between the corrected image 321 of frame No. 1 and the corrected images 322 to 325 of the remaining frames, and object extraction image No. 2 (332) is created by extracting and congregating differences between the corrected image 322 of frame No. 2 and the corrected images 321 and 323 to 325 of the remaining frames. In this way, object extraction image No. 3 (333) to object extraction image No. 5 (335) are created.

As shown in FIG. 11, the respective object extraction images 331 to 335 are obtained by extracting the objects of interest OB1 to OB5 from the moving portions of the respective frame images.

That is, differences between the respective frames to be processed are congregated as described above with the result that an image of a portion of the body of the user whose motion is small is preferably removed, and portions, such as the golf club, whose motion is obviously large, are extracted as the object of interest.

Extraction of the objects of interest as described above is carried out with respect to images acquired by another camera of the camera unit in the same manner.

Meanwhile, the objects of interest OB1 to OB5 extracted by congregating differences between an image of a corresponding image and images of the remaining frames as shown in FIG. 11 are unclear to some extent with the result that it is difficult to consider the objects of interest OB1 to OB5 as the golf club, and therefore, it is somewhat insufficient to confirm the motion of the golf club therefrom.

For this reason, it is necessary to fit straight lines with respect to the objects of interest OB1 to OB5 so that the motion of the golf club can be more clearly confirmed.

Although the respective objects of interest OB1 to OB5 must be displayed in the form of a straight line like the golf club, the respective objects of interest OB1 to OB5 are not displayed in the form of a clear straight line during image processing. For this reason, fitting of straight lines is necessary.

A random sample consensus (RANSAC) algorithm may be used as an example of a method of fitting straight lines with respect to objects of interest OB1 to OB5.

That is, the pixels constituting the respective objects of interest OB1 to OB5 may have information (inlier) on the golf club or incorrect information (outlier) irrelevant to the golf club. Factors having information on the golf club are predicted and corrected through repetition of a predetermined mathematical model with respect to a pixel group including the pixels having such incorrect information, thereby fitting straight lines.

Figure 12:
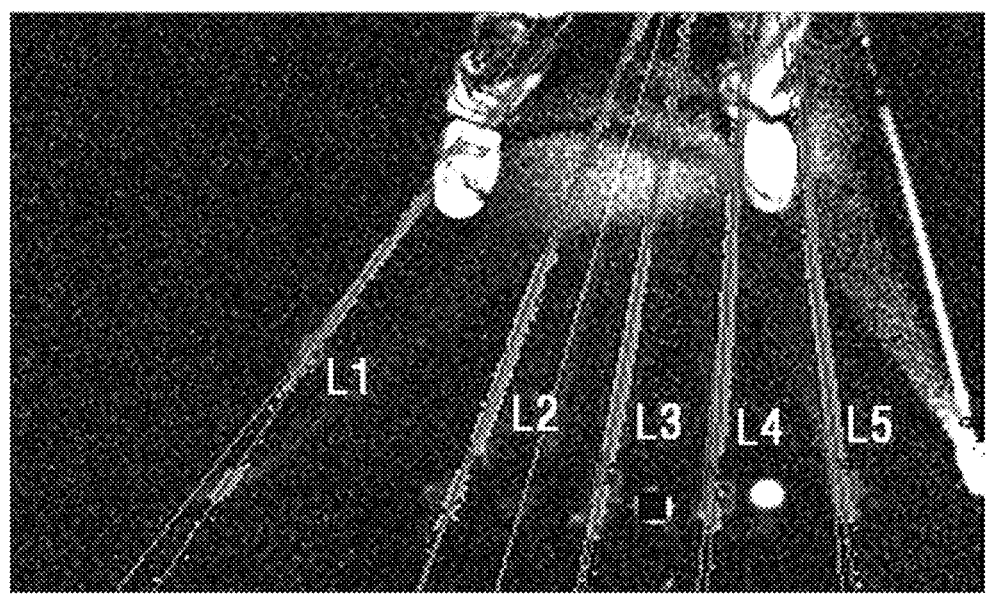
FIG. 12 is a view showing an image in which straight lines are fitted with respect to the respective objects of interest shown in FIG. 11.

FIG. 12 is a view showing an image obtained as the result of line fitting (a RANSAC algorithm is applied) of the objects of interest OB1 to OB5 on the respective object extraction images 331 to 335.

That is, in FIG. 12, a line L1 is obtained through line fitting of the object of interest OB1, a line L2 is obtained through line fitting of the object of interest OB2, a line L3 is obtained through line fitting of the object of interest OB3, a line L4 is obtained through line fitting of the object of interest OB4, and a line L5 is obtained through line fitting of the object of interest OB5.

Fitting of the straight lines as described above is carried out with respect to images acquired by another camera of the camera unit in the same manner.

Meanwhile, when fitted lines are extracted with respect to images acquired by a plurality of cameras constituting the camera unit as described above, it is necessary to check along what moving trajectory the golf club head is moved in a three-dimensional space through the extracted result.

Figure 13:
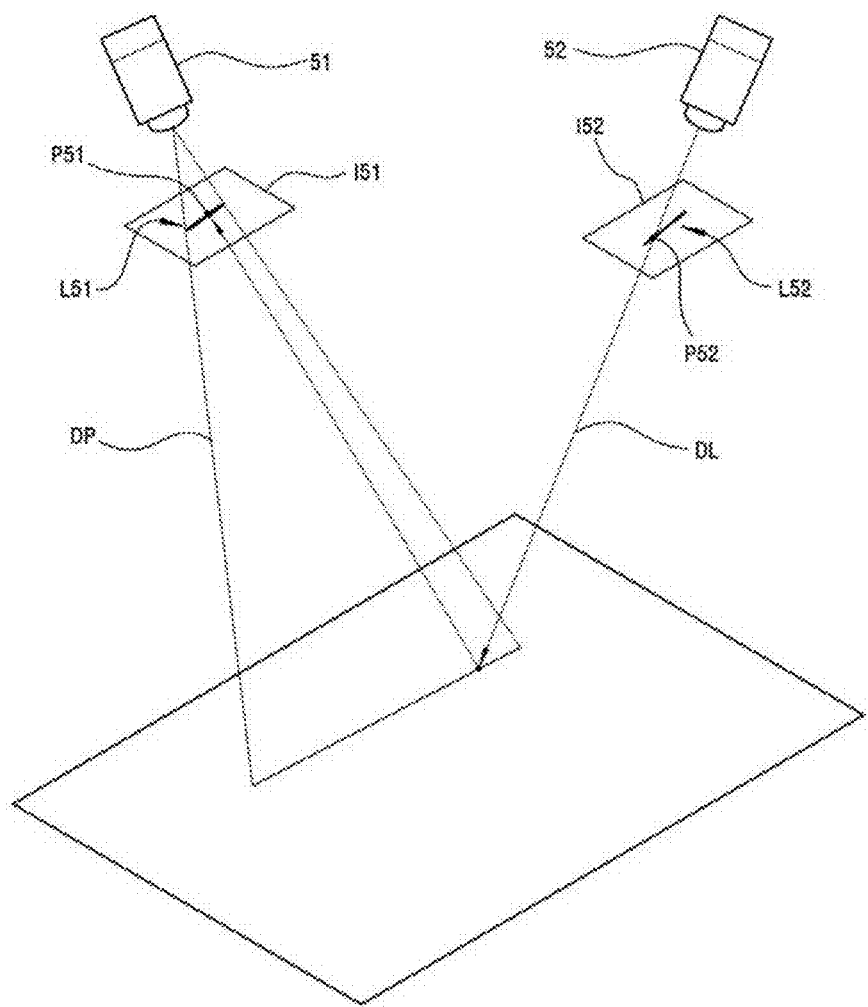
FIG. 13 is a view illustrating a three-dimensional matching principle with respect to the respective fitted lines shown in FIG. 12.

FIG. 13 is a view showing a principle of matching images acquired by the first camera 51 and the second camera 52 to calculate the moving trajectory of the golf club head.

In FIG. 13, it is assumed that an image acquired by the first camera 51 is 151, a fitted line of the image 151 is L51, and a plane in a three-dimensional space corresponding to the fitted line L51 on the image 151 of the first camera 51 is DP. Also, it is assumed that an image acquired by the second camera 52 is 152, a fitted line of the image 152 is L52, and a straight line in a three-dimensional space corresponding to the fitted line L52 on the image 152 of the first camera 52 is DL.

As shown in FIG. 13, a corresponding point P51 on the fitted line L51 corresponding to an intersection between the three-dimensional plane DP corresponding to the fitted line L51 in the first camera image 151 and the three-dimensional straight line DL corresponding to the fitted line L52 in the second camera image 152 is found.

Consequently, a point P52 on the fitted line L52 and the corresponding point P51 on the fitted line L51 constitute a pair of corresponding points.

Such corresponding points are investigated to find a portion corresponding to the golf club head, i.e. the end portion of each fitted line, from the respective fitted lines shown in FIG. 12.

If the end portion of each fitted line, i.e. the head portion of the golf club, is found, it is possible to extract coordinate information of the head portion in a three-dimensional space and to calculate the moving trajectory of the golf club head therefrom.

After the moving trajectory of the golf club head is calculated as described above, it is necessary to estimate spin of the moving ball therefrom.

Figure 14:
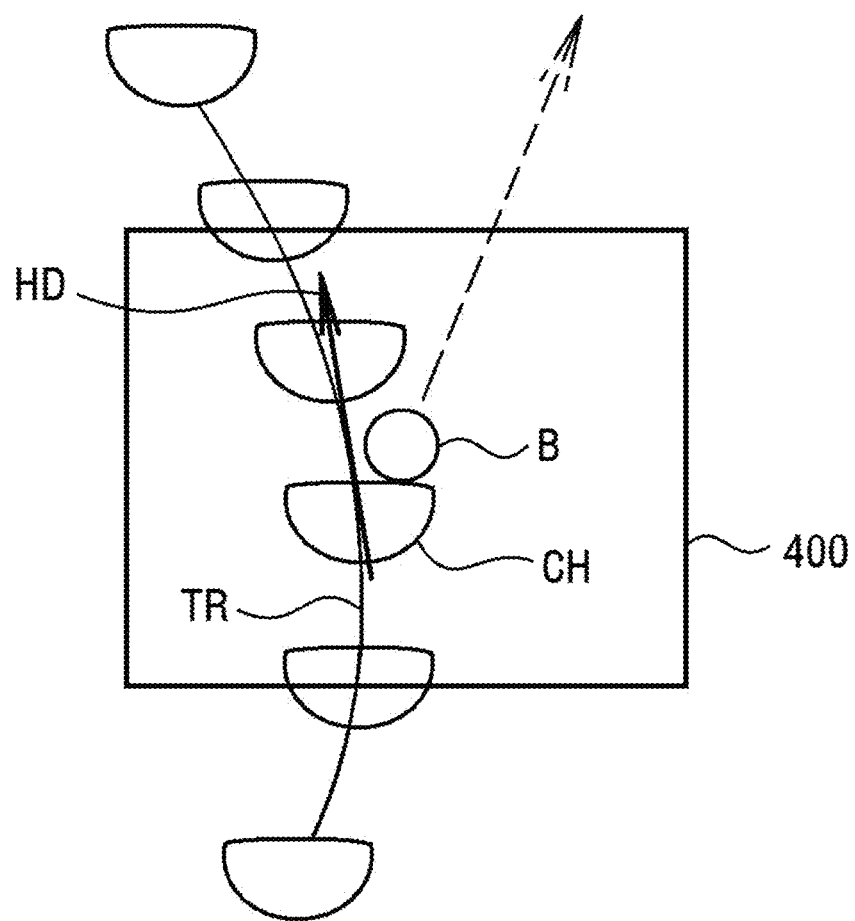
FIG. 14 is a view showing spin of a ball estimated through the moving trajectory of a golf club head calculated according to the principle shown in FIG. 13.

FIG. 14 is a view illustrating an example of a principle of estimating spin of the ball from the moving trajectory of the golf club head. FIG. 14 shows moving position of the golf club head CH for each frame and the moving trajectory TR of the golf club head based thereon. In FIG. 14, B indicates a ball.

It is not necessary to check the moving trajectory of the golf club head from the beginning to end in order to estimate spin of the ball. That is, as shown in FIG. 14, a region of interest 400 of a predetermined size about the ball B may be set, and the motion of the golf club head CH in the region of interest 400 may be observed.

If the size of the region of interest 400 is too small, rapid checking is possible but accuracy is lowered. On the other hand, if the size of the region of interest 400 is too large, accuracy is improved but checking speed is lowered. Preferably, therefore, the size of the region of interest 400 is set to a proper size in consideration of the above matters.

It is possible to extract the moving direction HD of the golf club head CH from the moving trajectory TR of the golf club head CH in the region of interest 400. It is preferable to extract the moving direction HD of the golf club head CH at the time of impact.

Consequently, it is possible to easily estimate how much sidespin or backspin the ball has after the ball has been hit from the moving direction HD of the golf club head CH.

FIG. 14 shows the moving direction of the golf club head on a plane for the convenience of description. Actually, it is possible to extract the moving direction of the golf club head in a three-dimensional space, and therefore, it is possible to easily estimate sidespin or backspin.

Figure 15:
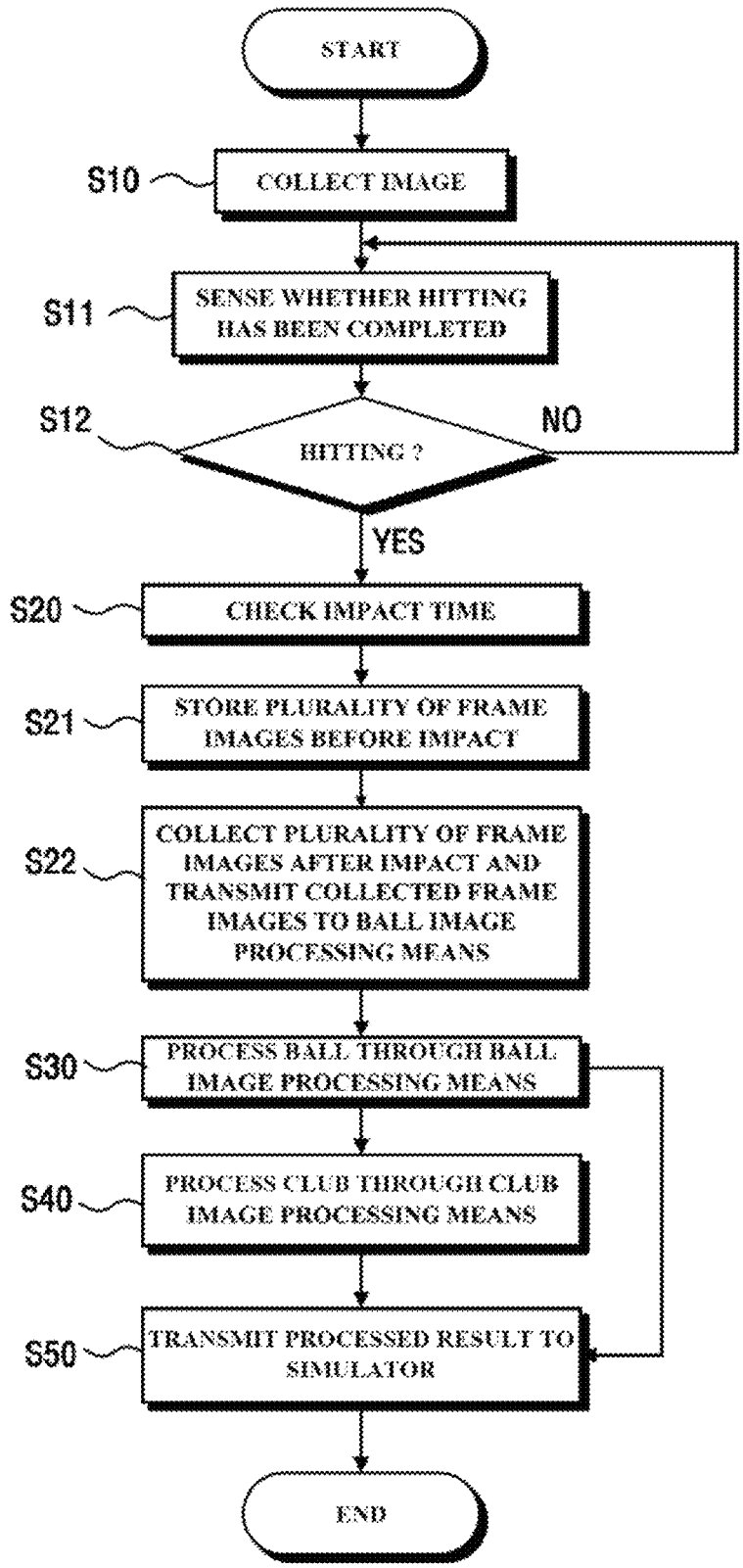
FIG. 15 is a flow chart showing a sensing method for virtual golf simulation according to an embodiment of the present invention.
Figure 16:
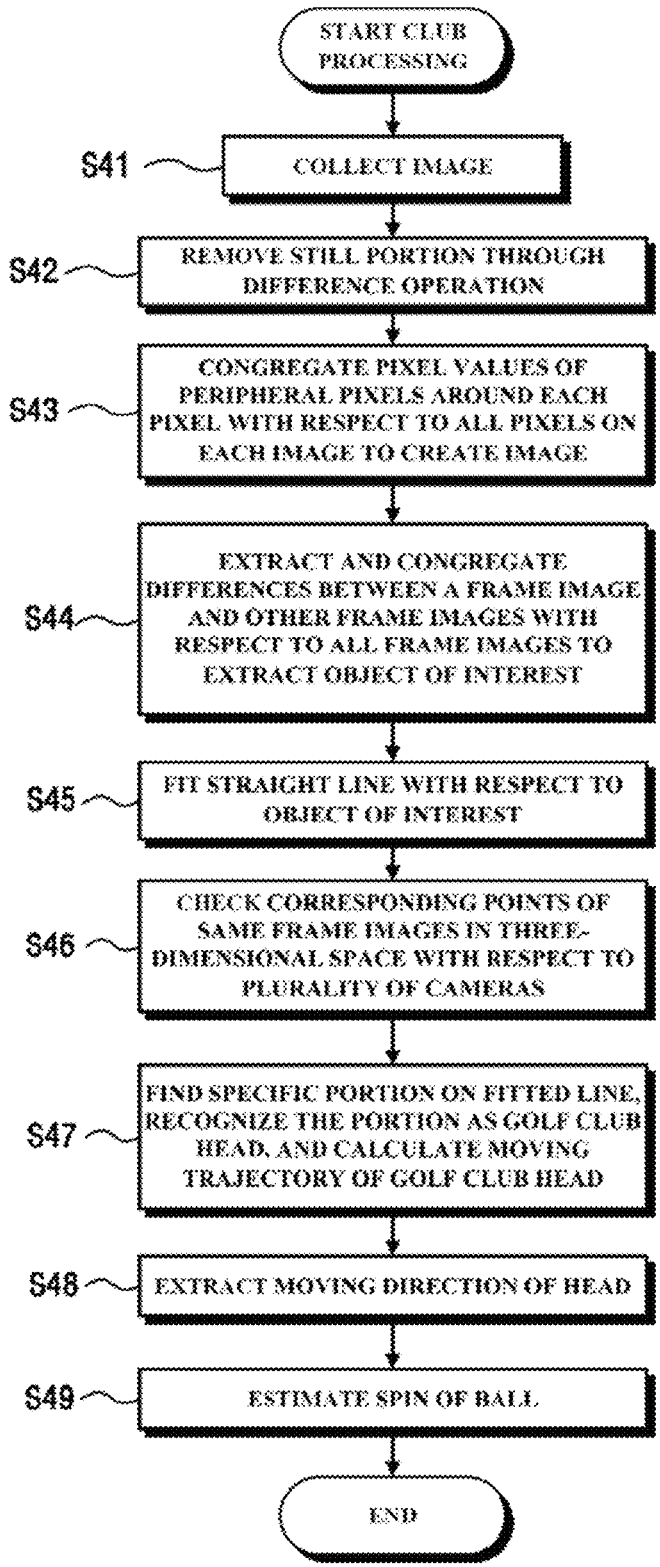
FIG. 16 is a flow chart showing a club processing step of FIG. 15 in more detail.

Hereinafter, a sensing method of a sensing device used in a virtual golf simulation apparatus according to an embodiment of the present invention will be described with reference to FIGS. 15 and 16.

First, the sensing method will be described with reference to FIG. 15. When the sensing device is operated, the sensing device successively collects images of a predetermined capturing range in which hitting is performed (S10). The collection process may be carried out by the grabber 65 shown in FIG. 3.

The collected images are transmitted to the hitting sensing means 70 (see FIG. 3), which analyzes the received images to sense whether a user has hit a ball (S11).

Upon sensing that the user has hit the ball as the result of image analysis performed by the hitting sensing means 70, the hitting sensing means 70 investigates a plurality of frame images before sensing of that hitting has been performed by the user to check exact impact time when a golf club has impacted the ball (S20).

Subsequently, the hitting sensing means 70 stores a plurality of frame images before impact (including an image at the time of impact) (S21).

Subsequently, the hitting sensing means 70 sequentially collects a plurality of frame images after impact from the grabber 65 and transmits the collected frame images to the ball image processing means in real time (S22).

The ball image processing means performs ball processing with respect to the received images (S30). If information, such as velocity, direction and altitude angle, of the ball is calculated as the result of ball processing, the ball image processing means transmits the calculated information to the simulator without waiting for the result processed by the club image processing means (S50).

The club image processing means receives the images stored at step S21 and the images processed by the ball image processing means and performs club processing (S40). If spin information of the ball is calculated as the result of club processing, the club image processing means transmits the calculated spin information of the ball to the simulator (S50).

The simulator starts to perform simulation using the information based on the ball processing result and reflects the spin information of the ball based on the club processing result during simulation to complete the simulation.

Hereinafter, the club processing shown in FIG. 15 will be described in more detail with reference to FIG. 16.

When the above club processing is commenced, a plurality of frame images before and after impact is collected from the hitting sensing means and the ball image processing means (S41).

In order to remove a still portion, i.e. a background image, from the collected images, difference images are extracted through difference operation with respect to images collected at another time (S42).

In order to increase the brightness of a moving portion in the images extracted through difference operation, pixel values of peripheral pixels around each pixel are congregated with respect to all pixels on each of the images to create an image (S43), which was previously described with reference to FIG. 9, and therefore, a detailed description thereof will be omitted.

After an image, the brightness of which has been corrected, is created, differences between a frame image and other frame images are extracted and congregated to extract an object of interest (a portion including the golf club) from each frame image. This process is carried out with respect to all frame images to be processed (S44).

The object of interest is extracted from each frame image through step S44. A straight line is fitted with respect to the extracted object of interest (S45).

Subsequently, corresponding points of the same frame images in a three-dimensional space with respect to a plurality of cameras are checked (S46) to find a specific portion on a fitted line (preferably, a portion corresponding to the golf club head, which may be an end portion of the fitted line), to recognize the portion of the fitted line as the golf club head, and to check coordinate movement of the portion, thereby calculating the moving trajectory of the golf club head (S47).

Subsequently, the moving direction of the golf club head is extracted from the calculated moving trajectory of the golf club head (S48), and spin of the moving ball is estimated therefrom (S49).

MODE FOR INVENTION

Various embodiments of the present invention have been described in the best mode.

INDUSTRIAL APPLICABILITY

The virtual golf simulation apparatus and method and a sensing device and method used for the same according to the present invention can be used in industries related to a golf game or so-called Screen Golf for a user to be able to play a virtual golf round by golf simulation based on a virtual reality.

The invention claimed is:

1. A sensing device used in a virtual golf simulation apparatus, comprising:
   a camera unit comprising at least one or more cameras configured to acquire a plurality of frame images of a ball and a golf club head as source images during hitting the ball by the golf club head; and
   a sensing processing unit comprising,
   a ball image processor configured to extract at least one or more ball images from each of the source images to obtain three-dimensional coordinates of the ball moved by hitting, and
   a club image processor configured to extract at least one or more images of moving object of interest from each of the source images to calculate a moving trajectory of the golf club head,
   wherein the club image processor is configured to:
      obtain difference images by processing difference operations, wherein the difference operations compare each of the source images to a reference image, create object extraction images from each of the obtained difference images by extracting differences between one of the difference images and remaining of the difference images then congregating the extracted differences, extract an object of interest as the moving object of interest from moving portions of the respective object extraction images, wherein the ball images extracted by the ball image processor are excluded for extracting the object of interest, fit a straight line for the respective moving object of interest, and calculate a trajectory of the fitted straight line for the respective moving object of interest as the moving trajectory of the golf club head, wherein the sensing processing unit is configured to calculate information on physical properties including at least one of velocity, direction and altitude angle of the moving ball using the three-dimensional coordinates of the moving ball obtained by the ball image processor, and to estimate a spin of the moving ball from the moving trajectory of the golf club head calculated by the club image processor.

2. The sensing device according to claim 1, wherein the club image processor is configured to receive an image from the ball image processor and process the received image from which the ball, extracted each image processed by the ball image processor, has been removed.

3. The sensing device according to claim 1, further comprising:

a hitting sensor configured to process each of the images received from the camera unit to sense whether hitting has been performed by the user, thereby confirming impact time.

4. The sensing device according to claim 3, wherein the ball image processor is configured to receive a plurality of frame images after impact from the hitting sensing sensor and to process the received images, and the club image processor is configured to receive a plurality of frame images before impact from the hitting sensor and the images processed by the ball image processor and to process the received images.

5. The sensing device according to claim 1, wherein the club image processor further configured to estimate the spin of the moving ball a based on a region of interest including a predetermined size with respect to a position of the ball in a still state, and to determine moving trajectory of the golf club head in the region of interest by detecting a moving direction of the golf club head.

6. A sensing device used in a virtual golf simulation apparatus, comprising:

a camera unit comprising at least one or more cameras configured to acquire a plurality of frame images of a ball and a golf club head as source images during hitting the ball by the golf club head; and a club image processor configured to obtain difference images by processing difference operations, wherein the difference operations compare each of the source images to a reference image, create object extraction images from each of the obtained difference images by extracting differences between one of the difference images and remaining of the difference images then congregating the extracted differences, extract an object of interest as a moving object of interest from moving portions of the respective object extraction images, wherein the ball images are excluded for extracting the object of interest, fit a straight line for the respective moving object of interest, and calculate a trajectory of the fitted straight line for the respective moving object of interest as a moving trajectory of the golf club head.

7. The sensing device according to claim 6, wherein the estimate of the fitted straight line from the difference among the respective one or more still images of the moving object of interest is performed by removing a still portion from the respective one or more still images of the moving object of interest, wherein an image is created by congregating pixel values of a predetermined number of peripheral pixels with respect to all pixels on the difference.

8. The sensing device according to claim 6, wherein the club image processor is further configured to:

detect coordinate movement of a portion of the fitted straight line to calculate the moving trajectory; and determine an estimation of spin of the ball based on the moving trajectory of the golf club head associated with the calculated fitted line.

9. A computer-implemented sensing method of a sensing device used in a virtual golf simulation apparatus, comprising:

successively collecting images of a plurality of frame images of a moving ball associated with a predetermined capturing range;

detecting whether a ball being hit;

extracting at least one or more still ball images from each of the frame images of the moving ball to obtain three-dimensional coordinates of the moving ball;

extracting at least one or more still images of moving object of interest comprising a moving club other than the moving ball from each of the acquired frame images to calculate a moving trajectory of a golf club head, wherein the step of extracting at least one or more still images of moving object includes, obtaining difference images by difference operations, wherein the difference operations compare each of the still images of moving object to a reference image, creating object extraction images from each of the obtained difference images by extracting differences between one of the difference images and remaining of the difference images then congregating the extracted differences, extracting an object of interest as the moving object of interest from moving portions of the respective object extraction images, wherein the ball images are excluded for extracting the object of interest, fitting a straight line for the respective moving object of interest, and calculating a trajectory of the fitted straight line for the respective moving object of interest as a moving trajectory of the golf club head, wherein information on physical properties including at least one of velocity, direction and altitude angle of the moving ball is calculated using the three-dimensional coordinates of the moving ball obtained, and information on physical properties including spin of the moving ball from the moving trajectory of the golf club head is calculated.

10. The computer-implemented sensing method according to claim 9, further comprising:

extracting a ball candidate for each frame with respect to the frame images;

converting three-dimensional coordinates of the ball candidate into two-dimensional coordinates to extract at least one two-dimensional trajectory obtained by connecting the ball candidates of the respective frames are connected to each other; and analyzing the two-dimensional trajectory to extract a trajectory of the ball, thereby obtaining three-dimensional coordinates of the ball on the trajectory of the ball.

11. A computer-implemented sensing method of a sensing device used in a virtual golf simulation apparatus, comprising:

acquiring a plurality of frame images of moving object of interest comprising a moving ball and moving object comprising a moving club;

extracting at least one or more still images from each of the frame images of the moving club;

obtaining difference images by difference operations, wherein the difference operations compare each of the frame images of the moving club to a reference image, creating object extraction images from each of the obtained difference images by extracting differences between one of the difference images and remaining of the difference images then congregating the extracted differences, extracting an object of interest as the moving object of interest from moving portions of the respective object extraction images, wherein the moving ball images are excluded for extracting the object of interest, fitting a straight line for the respective moving object of interest, and calculating a trajectory of the fitted straight line for the respective moving object of interest as a moving trajectory of the golf club head.

12. The computer-implemented sensing method according to claim 11, further comprising:

removing a still portion from each of the acquired a plurality of frame images;

congregating pixel values of a predetermined number of peripheral pixels with respect to all pixels on the difference operated image to create an image; and extracting and congregating differences between a first frame image and a second frame image with respect to all the frame images to be processed to extract a portion corresponding to the golf club as the object of interest.

13. The computer-implemented sensing method according to claim 11, further comprising:

checking corresponding points of frame images in a three-dimensional space with respect to cameras; and determining an end portion of the fitted line, recognizing the end portion as a golf club head, and checking coordinate movement of the golf club head to calculate a three-dimensional trajectory thereof.

14. The computer-implemented sensing method according to claim 13, further comprising:

setting a region of interest of a predetermined size about a position of the ball in a still state;

checking the moving trajectory of the golf club head in the region of interest to extract a moving direction of the golf club head; and estimating spin of the moving ball from the moving direction of the golf club head.

* * * * *